(12) United States Patent
Schalkwyk

(10) Patent No.: US 6,629,075 B1
(45) Date of Patent: Sep. 30, 2003

(54) LOAD-ADJUSTED SPEECH RECOGINTION

(75) Inventor: Johan Schalkwyk, Somerville, MA (US)

(73) Assignee: SpeechWorks International, Inc., Boston, MA (US)

( * ) Notice: Subject to any disclaimer, the term of this patent is extended or adjusted under 35 U.S.C. 154(b) by 259 days.

(21) Appl. No.: 09/591,161

(22) Filed: Jun. 9, 2000

(51) Int. Cl.[7] ............................................. G10L 21/00
(52) U.S. Cl. ....................................... 704/270; 704/275
(58) Field of Search ................................. 704/270, 275

(56) References Cited

U.S. PATENT DOCUMENTS

| | | | |
|---|---|---|---|
| 4,015,088 A | * | 3/1977 | Dubnowski et al. ........ 704/208 |
| 4,439,839 A | | 3/1984 | Kneib et al. |
| 4,750,116 A | * | 6/1988 | Pham et al. ................. 709/104 |
| 4,974,191 A | * | 11/1990 | Amirghodsi et al. ........ 345/700 |
| 6,122,613 A | * | 9/2000 | Baker .......................... 704/235 |
| 6,205,543 B1 | * | 3/2001 | Tremblay et al. ........... 712/228 |
| 6,253,297 B1 | * | 6/2001 | Chauvel et al. ............. 711/154 |

* cited by examiner

Primary Examiner—Doris H. To
Assistant Examiner—Michael N. Opsasnick
(74) Attorney, Agent, or Firm—Hale and Dorr LLP

(57) ABSTRACT

A speech recognition system includes a user interface configured to provide signals indicative of a user's speech. A speech recognizer of the system includes a processor configured to use the signals from the user interface to perform speech recognition operations to attempt to recognize speech indicated by the signals. A control mechanism is coupled to the voice recognizer and is configured to affect processor usage for speech recognition operations in accordance with a loading of the processor.

2 Claims, 3 Drawing Sheets

LOAD-ADJUSTED SPEECH RECOGNITION

FIELD OF THE INVENTION

The invention relates to speech recognition and more particularly to adaptive speech recognition with variable recognition computation.

BACKGROUND OF THE INVENTION

Computer-based speech-processing systems have become widely used for a variety of purposes. Some speech-processing systems provide Interactive Voice Response (IVR) between the system and a caller/user. Examples of applications performed by IVR systems include automated attendants for personnel directories, and customer service applications. Customer service applications may include systems for assisting a caller to obtain airline flight information or reservations, or stock quotes.

IVR systems interact with users by playing prompts and listening for responses from users. The responses are attempted to be recognized and various actions can be performed in response to recognized speech.

Processors of computers used in IVR systems perform operations to attempt to recognize the user's speech. The processor can concurrently attempt to recognize speech of several users interacting with the IVR system over separate lines, e.g., telephone lines. The amount of the processing capacity of the processor used can vary as the number of users interacting with the system varies. During peak calling times, the capacity may be nearly fully used, or even completely used. Systems typically are designed to accommodate peak calling times.

SUMMARY OF THE INVENTION

In general, in one aspect, the invention provides a speech recognition system including a user interface configured to provide signals indicative of a user's speech. A speech recognizer of the system includes a processor configured to use the signals from the user interface to perform speech recognition operations to attempt to recognize speech indicated by the signals. A control mechanism is coupled to the voice recognizer and is configured to affect processor usage for speech recognition operations in accordance with a loading of the processor.

Implementations of the invention may include one or more of the following features. The user's speech includes multiple utterances and the control mechanism is configured to determine the processor loading at a beginning of each utterance.

The control mechanism is configured to determine which category of a plurality of processor loading categories represents current processor loading and to affect processor usage for attempting to recognize speech according to the determined category. There are four categories corresponding to the processor loading being relatively idle, normal, busy, and pegged, wherein the control mechanism is configured to affect computational levels of the processor for recognizing speech such that a computational level of the processor for recognizing speech is set to an idle limit, a normal limit, a busy limit, and a pegged limit when the processor loading is determined to be idle, normal, busy, and pegged respectively, and wherein the idle limit is about twice the busy limit, the normal limit is about 1.5 times the busy limit, and the pegged limit is about 0.8 times the busy limit. The processor is configured to perform speech recognition operations in accordance with stored instructions that include recognition parameters that affect the computational level of the processor, wherein sets of recognition parameters correspond to the processor computational level limits, and wherein the control mechanism is configured to select a set of the recognition parameters according to the determined processor loading. The recognition parameters correspond to at least one of a fast-match threshold, across word pruning, and short-list depth.

In general, in another aspect, the invention provides a method of adaptive speech recognition, the method including receiving indicia of speech, setting speech recognition accuracy parameters in accordance with loading of a processor configured to perform speech recognition operations, and using the set speech recognition parameters to perform the speech recognition operations to attempt to recognize the speech using the received indicia.

Implementations of the invention may include one or more of the following features. The speech includes multiple utterances and wherein the setting occurs at a beginning of each utterance.

The method further includes determining which category of a plurality of processor loading categories represents processor loading at a given time and wherein the setting sets the recognition parameters, affecting processor usage for attempting to recognize speech, until processor loading is again determined. There are four categories corresponding to the processor loading being relatively idle, normal, busy, and pegged, wherein the setting sets the recognition parameters such that potential computational loading of the processor for recognizing speech is about twice, about 1.5 times, and about 0.8 times, the potential computational loading of the processor for speech recognition when the processor is determined to be busy if the processor is determined to be idle, normal, and pegged, respectively. The recognition parameters correspond to at least one of a fast-match threshold, across word pruning, and short-list depth.

In general, in another aspect, the invention provides a computer program product, residing on a computer readable medium, including instructions for causing a computer to: receive indicia of speech, set speech recognition accuracy parameters in accordance with loading of a processor of the computer, and use the set speech recognition parameters to perform the speech recognition operations to attempt to recognize the speech using the received indicia.

Implementations of the invention may include one or more of the following features. The speech includes multiple utterances and wherein the instructions for causing a computer to set the parameters cause the computer to set the parameters at a beginning of each utterance.

The computer program product further includes instructions for causing the computer to determine which category of a plurality of processor loading categories represents processor loading at a given time and wherein the instructions for causing the computer to set the recognition parameters cause the computer to set the recognition parameters, affecting processor usage for attempting to recognize speech, until processor loading is again determined. There are four categories corresponding to the processor loading being relatively idle, normal, busy, and pegged, wherein the instructions for causing the computer to set the recognition parameters cause the computer to set the recognition parameters such that potential computational loading of the processor for recognizing speech is about twice, about 1.5 times, and about 0.8 times, the potential computational loading of the processor for speech recognition when the processor is determined to be busy if the processor is determined to be idle, normal, and pegged, respectively. The recognition parameters correspond to at least one of a fast-match threshold, across word pruning, and short-list depth.

In general, in another aspect, the invention provides a speech recognition system including an input configured to receive signals indicative of speech. A processor is configured to read instructions stored in memory and to perform operations indicated by the instructions in order to recognize the speech indicated by the received signals. The system also includes means for adjusting a speech recognition computational amount of processor as a function of availability of the processor.

Implementations of the invention may include one or more of the following features. The adjusting means adjusts the computational amount in accordance with the availability of the processor at a beginning of an utterance of the speech indicated by the received signals. The adjusting means adjusts the computational amount in accordance with the availability of the processor only at a beginning of an utterance of the speech indicated by the received signals. The adjusting means adjusts the computational amount to one of a first level, a second level, a third level, and a fourth level, respectively corresponding to four ranges of load as a percentage of processor capacity, the first level having a maximum computational amount of about twice a maximum computational amount of the third level, the second level having a maximum computational amount of about 1.5 times the maximum computational amount of the third level, and the fourth level having a maximum computational amount of about 0.8 times the maximum computational amount of the third level.

Various aspects of the invention may provide one or more of the following advantages. Peak periods of speech recognition system use can be accommodated and accuracy of speech recognition may be improved in non-peak periods compared to peak periods. Improved usage of processing capacity compared to current techniques may be achieved. Adaptive speech recognition accuracy for processor load changes as well as information for accurate offline simulations are both provided for. Speech recognition accuracy may be adjusted during a user's call. System crashes due to fixed processing assumptions can be reduced and/or avoided. Transaction completion rates can be improved versus fixed speech recognition computation systems.

These and other advantages of the invention, along with the invention itself, will be more fully understood after a review of the following drawings, detailed description, and claims.

DETAILED DESCRIPTION OF PREFERRED EMBODIMENTS

Embodiments of the invention provide techniques for adaptive speech recognition processing in both times of relatively light processing loads on a processor and relatively heavy processing loads. Relatively more processing capacity is used for speech recognition during times of relatively light loads and relatively less processing capacity is used for speech recognition during times of relatively heavy loads. The relative heaviness or lightness depends on the processing capacity. The amount of processing capacity used for speech recognition can be adapted/adjusted as a function of available processing capacity. For example, a load on a central processing unit (CPU) can be divided into categories of idle, normal, busy, and pegged. Using the amount of CPU capacity allocated for speech recognition during busy times as a baseline, the amount of CPU processing can be designated as 1.0 speech processing CPU unit. Exemplary CPU usages for speech recognition can be 2.0 CPU units during idle times, 1.5 CPU units during normal-load times, 1.0 CPU unit during busy times, and 0.8 CPU units during pegged times.

Figure 1:
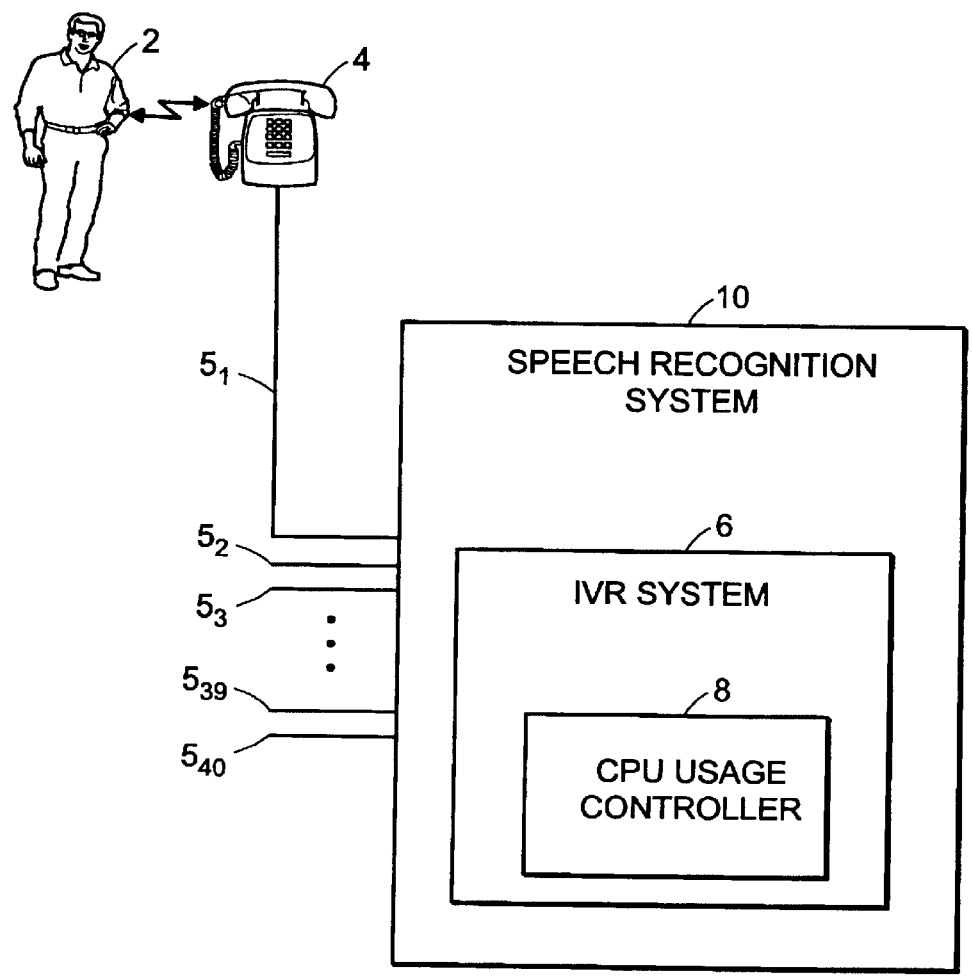
FIG. 1 is a simplified diagram of a user interacting through a telephone with a speech recognition system according to the invention.

Referring to FIG. 1, a user 2 is connected through a telephone 4 to a speech recognition system 10. The user 2 can interact with the system 10 through the phone 4 in a normal manner over a line $5_1$. As shown, more lines $5_2$–$5_{40}$, for a total of 40 lines, are provided for other users (not shown) to interact with the system 10. The system 10 includes an Interactive Voice Response (IVR) system 6, that includes a Central Processing Unit (CPU) usage controller 8. The controller 8 is configured to determine amounts of processor capacity that are available for speech recognition and to adapt recognition techniques in accordance with processor availability, as described more fully below. The system 10 is implemented as a computer system as shown in FIG. 2.

Figure 2:
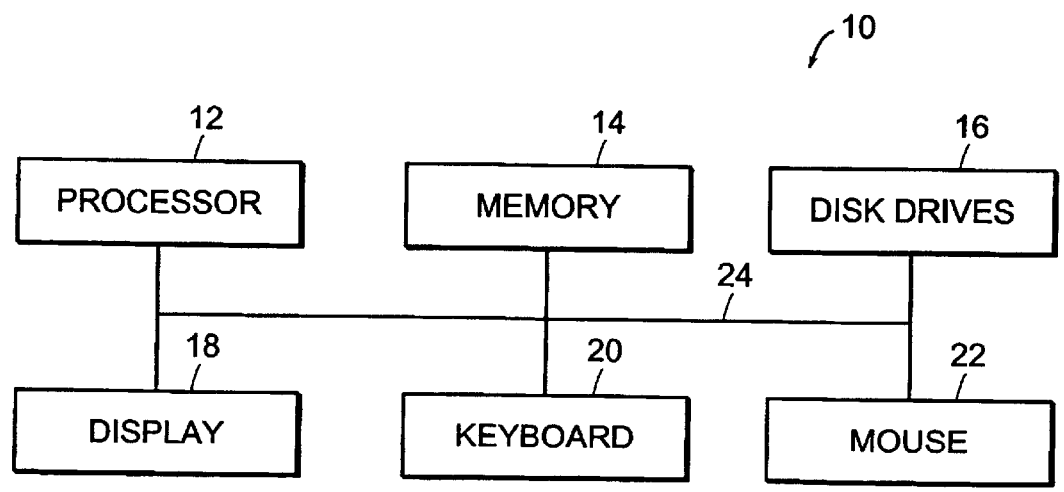
FIG. 2 is a simplified block diagram of a computer system shown in FIG. 1.

Referring also to FIG. 2, the speech recognition system 10 includes a processor 12, memory 14, disk drives 16, a display 18, a keyboard 20, and a mouse 22. The processor 12 can be a personal computer central processing unit (CPU) such as a Pentium® III processor made by Intel® Corporation. Memory 14 includes random access memory (RAM) and read-only memory (ROM). The disk drives 16 include a hard-disk drive and can include floppy-disk drives, a CD-ROM drive, and/or a zip drive. The display 18 is a cathode-ray tube (CRT), although other forms of displays are acceptable, e.g., liquid-crystal displays (LCD) including TFT displays. The keyboard 20 and mouse 22 provide data input mechanisms for an operator (not shown) of the system 10. The components 12, 14, 16, 18, 20, and 22 are connected by a bus 24. The computer system 10 can store, e.g., in memory 14, software code containing instructions for controlling the processor 12 to perform functions described herein. Due to the nature of software, features and functions described herein may be implemented using software, hardware, firmware, hardwiring, or combinations of any of these, that may be physically located other than as described, including being distributed in various locations.

The processor 12 is configured to perform operations including speech recognition operations. Operations are dictated by software instructions stored in the memory 14. Speech recognition operations include segmenting speech indicated by signals received on the line 5, applying fast-match models, comparing and correlating phonemes with possible text, and establishing prioritized lists of possible matches for speech, as well as numerous other operations known to those skilled in the art. Other operations, aside from speech recognition operations, include actuating prompts to be played to the user. The amount of computation, for speech recognition and otherwise, performed by the processor 12 indicates the loading of the processor. The loading is thus dependent on the number of calls to the system 10, which can vary through the day.

Figure 3:
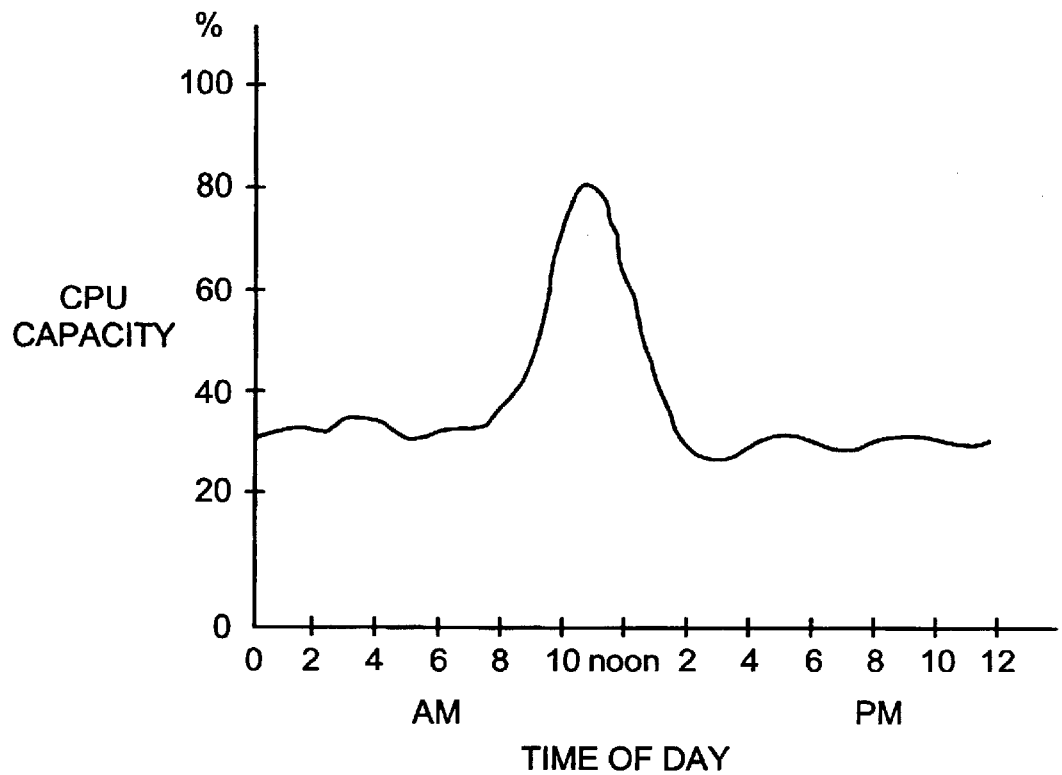
FIG. 3 is a plot of usage over time of a processor of the computer system shown in FIG. 2 as a function of computational capacity of the processor.

Referring to FIG. 3, the processor loading is shown to vary through the day, with the processor 10 being under utilized during a majority of the day. The plot shown indicates the processor's usage as a percentage of the processor's capacity and is exemplary only. Other variations in processor capacity are possible, e.g., with the processor 12 being used to a higher percentage of capacity for more of the day than as shown, or less than as shown. As shown, the processor 12 is used most during the middle of the day, and reaches nearly 80% of capacity, but much of the processor's capacity is not used during much of the day. Processing requirements imposed on the processor 12 must account for the anticipated peak usage, high-load times of the day. This typically entails requiring only amounts of computation that will be available during the high-load times, even though these high-load conditions may not exist for much of the day. Accounting for the high-load times often means that less computation for speech recognition is used than would be used if more processing capacity was anticipated. This sacrifice in computation translates into possible sacrifices in speech recognition accuracy. Also, fixing the computation to accommodate less than 100% capacity, as is often done, can result in crashes of the system 10 (FIG. 1) especially when processing demands are high.

The invention provides techniques for determining the loading on the processor 12 (FIG. 2), and adjusting the amount of the processor's capacity used to attempt to recognize speech received by the system 10 (FIG. 1). More processor capacity may be used to try to improve the accuracy with which incoming speech is recognized.

Figure 4:
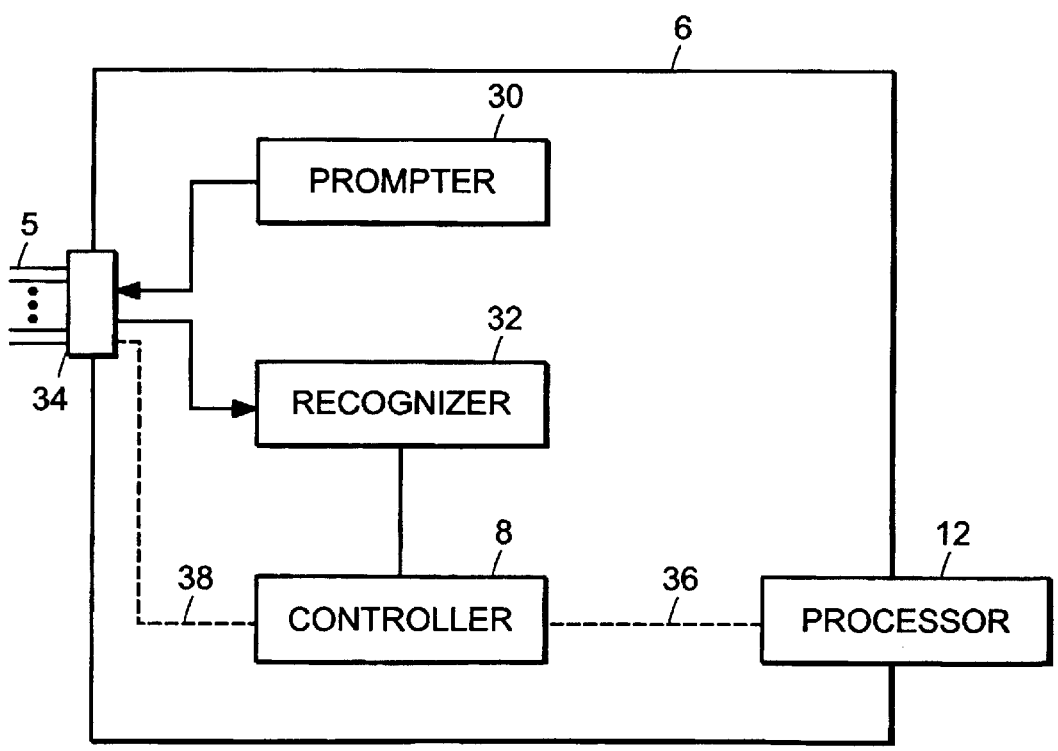
FIG. 4 is a functional block diagram of an Interactive Voice Response system shown in FIG. 1.

Referring to FIGS. 1 and 4, the IVR system 6 includes functional blocks of a prompter 30, a recognizer 32, and the controller 8, and shares an interface 34 to the lines from the users including line 5, and also shares the processor 12. Both the prompter 30 and the recognizer 32 are implemented as software instructions stored in the memory 14 (FIG. 2) to control the processor 12 to perform various operations. The prompter 30 plays prompts to the users through the interface 34. Prompts can, e.g., inform the user 2 or query the user 2 for information. The recognizer 32 receives signals from the interface 34 indicative of, e.g., speech, from the user 2 and attempts to recognize the speech.

The recognizer 32 has several recognition parameters that govern techniques employed by the recognizer 32 for recognizing speech. These recognition parameters include a fast-match threshold, an across-word pruning value, and a short-list depth. The fast-match threshold indicates the number of acoustic models to analyze to attempt to recognize a speech portion. The across-word pruning value indicates how many hypotheses of potential matches to keep/consider. The short-list depth is related to the fast-match model and is used to reoder model components and designate the number of model components to compute. Each of these recognition parameters affect the amount of computation by the processor 12 used to try to recognize speech. This affects how much time is spent attempting to recognize speech.

The controller 8 is configured, as indicated by line 36, to monitor the processor loading by monitoring a "Performance Data Helper" Microsoft® library. In particular, the controller 8 monitors a counter in the library that is indicative of CPU load. The controller 8 is configured to determine the processor load at the beginning of each utterance by the user 2. Preferably, the determination of the load is relative to the processor capacity although this is not required.

The controller 8 is configured to determine the processor load according to one of four categories: idle, normal, busy, and pegged. These categories correspond to ranges of computational usage of the processor relative to the processor's capacity. For example, the processor 12 is considered idle if the usage is 0% to about 20% of capacity, normal if the usage is between about 20% and about 60% of capacity, busy if the usage is between about 60% and about 95% of capacity, and pegged if the usage is above about 95% of capacity. Other percentages may be used, such as about 60% to about 100% for the busy category, which would eliminate the pegged category.

The controller 8 is further configured to adjust the speech recognition parameters of the recognizer 32 as a function of the processor load/availability. Here, the controller 8 is configured to adapt the speech recognition parameters depending on the determined processor loading category. If the processor 12 is operating in the idle or normal regions, then the controller 8 can adjust the parameters to increase computation by the processor 12 used for speech recognition, which may in turn increase speech recognition accuracy. For example, the controller 8 can increase the fast-match threshold, across-word pruning value, and/or the short-list depth, although possibly not higher than maximum values for each. If the processor 12 is operating in the busy region, then the controller 8 can allow the recognition parameters to remain unchanged. If the processor 12 is operating in the pegged regions, the controller 8 can adjust the parameters to reduce speech recognition computation by the processor 12. For example, the controller 8 can decrease the fast-match threshold, across-word pruning value, and/or the short-list depth, although possibly not lower than down to minimum values for each. The controller 8 may not adjust the computational amount if the processor load category has not changed since the last determination of the processor load. The controller 8 is configured to adjust the recognition parameters such that the processor computation used for recognizing speech while in the idle, normal, and pegged categories, is about2.0, about 1.5, and about 0.8 times, respectively, the processor computation for recognizing speech while in the busy category. In each category, the computation used by the processor 12 for recognizing speech is governed by the recognition parameters.

The controller 8 can also report the determined processor load (e.g., store indicia of the load in the memory 20 (FIG. 2)). Determining and reporting the processor load at the beginning of each utterance helps provide sufficient, but not too much, information for post-processing (e.g., fault diagnosis) while helping to adjust for processor load variations, that may be frequent. Thus, while the load on the processor 12 varies, so do the demands placed on the processor 12 for recognizing speech, such that increased accuracy may be achieved when processor load is light and decreased demands placed on the processor 12 when the load is heavy. This can help reduce or guard against crashes due, e.g., to excessive processor loading.

Figure 5:
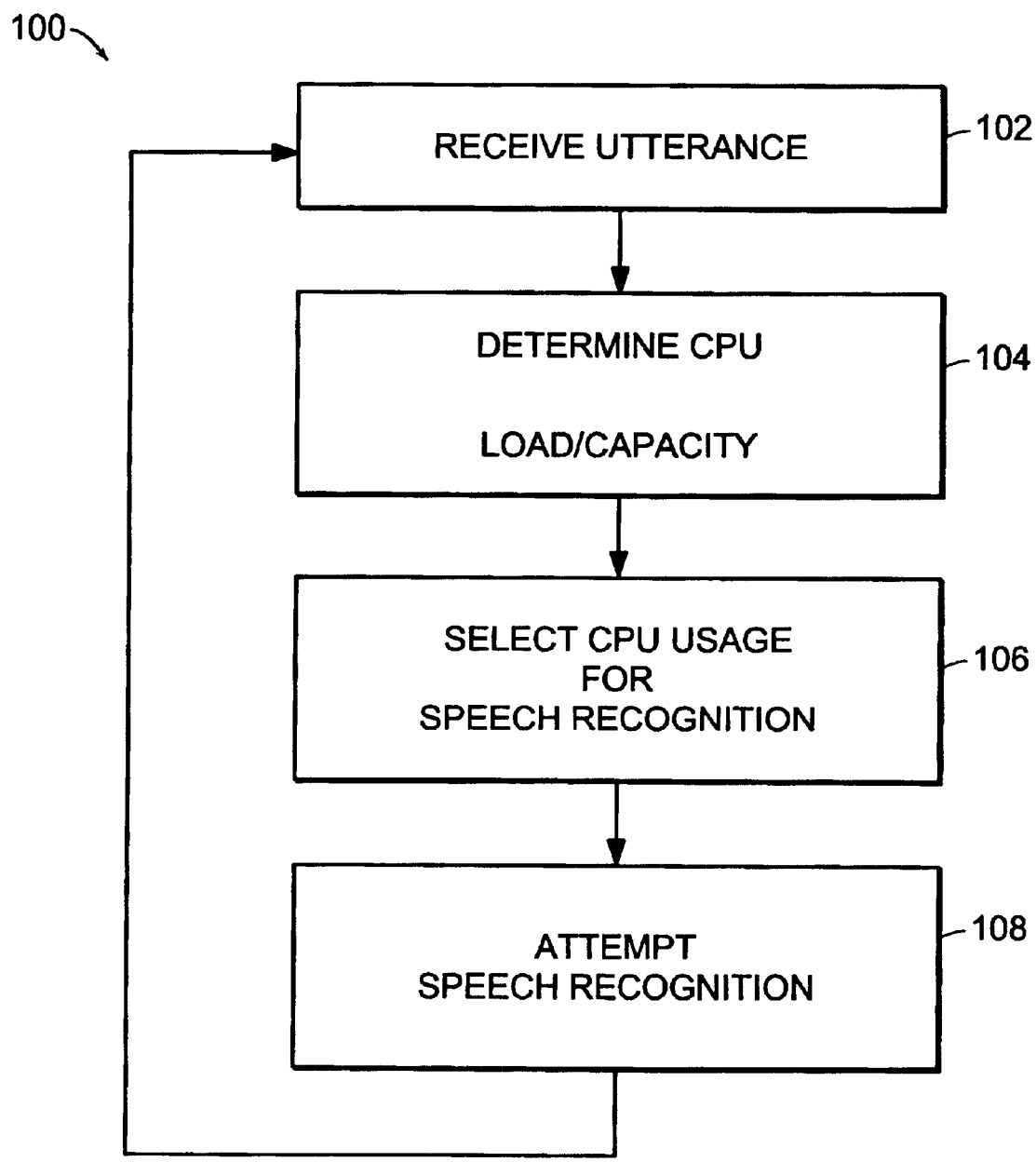
FIG. 5 is a flow diagram of a process of adaptively recognizing speech using the speech recognition system shown in FIG. 1.

Referring to FIG. 5, with additional reference to FIGS. 1–2 and 4, a process 100 of adaptively recognizing speech begins at a stage 102 when an utterance by the user 2 is received. The user speaks into the phone 4 that relays signals indicative of the speech to the system 10. The IVR system 6 receives the signals indicative of the speech through the interface 34.

At stage 104, the controller 8 determines the processor load relative to the capacity. Preferably, this is done at the beginning of each utterance, although this is not required. The controller 8 categorizes the processor load as either idle, normal, busy, or pegged.

At stage 106, the controller 8 selects/adjusts the speech recognition computation demands on the processor 12. The controller 8 selects/adjusts, as appropriate, the speech recognition parameters to increase the computational amount if the processor 12 is idle or normal categories. The controller 8 may not adjust the parameters if the parameters are at their maximum values and/or the load category has not changed between two or more load determinations. Likewise, the controller 8 can adjust the parameters to decrease speech recognition computation if the processor loading is in the pegged category, unless the parameters are at their minimum values and/or the category has not changed between two or more determinations.

At stage 108, the recognizer 32 attempts to recognize the utterance indicated by the received signals. The recognizer 32 uses the speech recognition parameters to attempt to recognize the speech in accordance with known techniques as influenced by the parameters.

The process returns to stage 102 upon the receipt of another utterance, on the line 5 from the user 2 or on another line from another user.

Other embodiments are within the scope and spirit of the appended claims. For example, other techniques for determining processor loading and/or available capacity are possible. As indicated by line 38 in FIG. 4, the controller 8 can be configured to monitor the incoming calls through the interface 34 to determine processor loading or at least an indication thereof (given that factors other than incoming calls affect processor loading). The controller 8 could also monitor swap space and/or cache as indicators of CPU availability and/or loading. Also, the division of the CPU loading into categories was exemplary only. Other categories, including number of categories and ranges of the categories, may be used. Additionally, categories need not be used at all. Smoothly varying functions of CPU usage relative to CPU load/availability may be employed, as well as functions that vary otherwise (e.g., smoothly, abruptly, or combinations of smooth and abrupt variations).

What is claimed is:

1. A speech recognition system comprising:

user interface logic configured to provide speech signals indicative of user speech;

speech recognition logic, responsive to processing parameters, wherein the processing parameters have an associated induced computational loading of a processor and an associated accuracy of speech recognition;

computational load-adjusting logic, responsive to a processor load variable representative of the computational loading of the processor, to adjust said processing parameters and thereby adjust computational loading of the processor and the accuracy of speech recognition, wherein the speech recognition logic includes logic to generate one or more sets of hypotheses that represent potential matches to speech signals and the computational load-adjusting logic includes logic to identify via the processing parameters the hypotheses to be used by the speech recognition logic.

2. The system of claim 1, wherein the speech recognition logic includes logic to select one or more sets of hypotheses and each set of hypotheses has an associated computational loading of the processor and associated accuracy of speech recognition.

* * * * *